(12) United States Patent
Töpfer

(10) Patent No.: US 6,651,705 B1
(45) Date of Patent: Nov. 25, 2003

(54) FILLING DEVICE WITH A CLOSING ARRANGEMENT

(75) Inventor: Klaus Töpfer, Büttelborn (DE)

(73) Assignee: Poly-Clip System GmbH & Co. KG, Frankfurt am Main (DE)

( * ) Notice: Subject to any disclaimer, the term of this patent is extended or adjusted under 35 U.S.C. 154(b) by 11 days.

(21) Appl. No.: 10/129,711

(22) PCT Filed: Nov. 1, 2000

(86) PCT No.: PCT/EP00/10739

§ 371 (c)(1),
(2), (4) Date: May 7, 2002

(87) PCT Pub. No.: WO01/33969

PCT Pub. Date: May 17, 2001

(30) Foreign Application Priority Data

Nov. 9, 1999 (DE) .......................................... 199 53 695

(51) Int. Cl.⁷ ............................................. B65B 43/42
(52) U.S. Cl. ............................. 141/155; 141/97; 53/576
(58) Field of Search ....................... 141/155, 97; 53/77, 53/576, 550, 567, 548, 549, 551, 552; 206/802; 452/21, 22, 48

(56) References Cited

U.S. PATENT DOCUMENTS

| | | | | |
|---|---|---|---|---|
| 3,621,513 A | * | 11/1971 | Kupcikevicius | 452/48 |
| 3,860,996 A | * | 1/1975 | Kupcikevicius et al. | 452/48 |
| 3,975,795 A | * | 8/1976 | Kupcikevicius et al. | 452/38 |
| 4,017,941 A | * | 4/1977 | Raudys et al. | 452/48 |
| 4,044,425 A | * | 8/1977 | Nausedas | 452/48 |
| RE30,390 E | * | 9/1980 | Kupcikevicius et al. | 452/31 |
| 4,430,772 A | * | 2/1984 | Michel et al. | 53/576 |
| 4,505,003 A | * | 3/1985 | Becker et al. | 53/576 |
| 4,563,792 A | * | 1/1986 | Niedecker | 53/550 |
| 4,675,945 A | * | 6/1987 | Evans et al. | 452/48 |
| 4,766,713 A | * | 8/1988 | Evans | 452/48 |
| 5,346,425 A | | 9/1994 | Kuenzel et al. | 452/38 |
| 5,918,447 A | * | 7/1999 | Hanten et al. | 53/551 |
| 6,146,261 A | * | 11/2000 | Bienert et al. | 452/22 |

FOREIGN PATENT DOCUMENTS

| | | | |
|---|---|---|---|
| DE | 1 290 070 | 2/1969 | |
| DE | 24 20 202 C2 | 11/1975 | B65B/9/15 |
| DE | 26 01 595 B2 | 7/1978 | B65B/39/06 |
| DE | 3206675 A1 * | 9/1983 | 452/48 |
| DE | 32 14 018 A1 | 10/1983 | A22C/11/02 |
| WO | WO 90/03114 | 4/1990 | A22C/11/02 |

* cited by examiner

Primary Examiner—Timothy L. Maust
Assistant Examiner—Khoa Huynh
(74) Attorney, Agent, or Firm—Norris McLaughlin & Marcus

(57) ABSTRACT

Device for filling and closing tubular packages having a safety ring for blocking the crimping and clip setting elements from unintended actuation.

6 Claims, 3 Drawing Sheets

FILLING DEVICE WITH A CLOSING ARRANGEMENT

This is a 371 of PCT/EP00/10739 filed Nov. 1, 2000 (international filing date).

This invention relates to a device for filling flowable to pasty filling into tubular packaging material which by means of the filling pressure in the packaging material unilaterally closed at its downstream end is withdrawn. from a filling tube against the frictional force of a brake ring (casing brake) which encloses the filling tube and is held in a housing, a closing means with elements radially crimping the packaging material being disposed subsequent to the filling tube in flow direction of the filling.

BACKGROUND OF THE INVENTION

There is known a wide variety of such filling devices, for instance for producing sausages. They are usually adapted for the continuous operation for producing a sequence of discrete packages (sausages), the closing means always—intermittently—being put into operation when the desired degree of filling of a package has been reached and filling the next package should be started (DE 26 01 595 B2, DE 24 20 202 C2).

In the course of the development, the degree of automation and the operating speed of such filling plants have increased to such an extent that especially the closing means with its crimping elements gathering the packaging material to form a neck (but also the possibly provided separating means) represents a serious risk for the operators, should they try, for instance, to repair a malfunction with the machine running or when the same is slowing down. The same is true when, in the course of the regular operation, the supply of packaging material provided on the filling tube is used up and must be replenished. Therefore, safety regulations provide that extensive covers in the form of grids or the like in flow direction of the filling both before and behind the closing means prevent the access to the same during operation and allow such access only during the standstill of the machine.

In the prior art it is therefore required that when the filling tube must be fitted with new packaging material (usually by swivelling the filling tube to the side), not only the cover on the side of the filling tube is opened, but the entire machine head with the crimping and closing mechanism as well as possibly the separating means and the casing brake together with its housing are moved to the side to such an extent that the filling tube gets clear of these means. This necessitates a complex machine construction and requires considerable operating time.

SUMMARY OF THE INVENTION

This should be overcome by means of the invention. The invention provides that the brake ring housing is connected with a coaxially arranged safety ring and can be moved together with the same in axial direction of the filling tube such that the safety ring is located in the active planes of the elements of the closing means when the brake ring has left the filling tube. To clear the filling tube for being newly charged with packaging material, the brake ring housing together with the safety ring need therefore only be shifted in axial direction. When the brake ring leaves its functional position on the filling tube, said safety ring blocks the crimping and clip-setting elements as well as possibly the separating elements which are disposed coaxially with respect to the filling tube and during operation move in radially inward direction. Injuries due to an unintended actuation of these elements are therefore excluded. When the combination of brake ring, housing thereof and safety ring (at the end of charging the filling tube with packaging material) returns from that operating position of the safety ring to its neutral position—which corresponds to the functional position of the brake ring—, the operability of the crimping and closing mechanism is restored on the one hand, and on the other hand the safety ring now disposed before that mechanism on the filling tube side prevents inadvertent operation of the same, so that there is not required any further cover on the side of the filling tube.

Preferably, the arrangement is made such that at its end facing the filling tube the safety ring is closed by a circular bottom. Due to this design as "safety bell", the stability of the construction is increased on the one hand, and on the other hand its safety function is increased. Furthermore, the brake ring housing can replaceably be arranged at this bottom in a holder attached thereto.

DETAILED DESCRIPTION

Advantageously, the safety ring (with the brake ring housing) is slidably guided on a longitudinal guideway arranged in parallel to the filling tube and can be moved into its end positions by means of a fluid-actuated cylinder. There may furthermore be provided a safety switch, which switches off the closing means when the safety ring leaves its neutral position, and which initiates a single closing operation when the safety ring returns to its neutral position. The latter leads to the fact that the required closing of the packaging material at the downstream end is effected automatically before the again first filling operation. Then, the usual automatic filling operation can be initiated—expediently by means of a two-hand operation.

BRIEF DESCRIPTION OF THE DRAWINGS

The drawing illustrates the invention with reference to an embodiment, in which.

Figure 1:
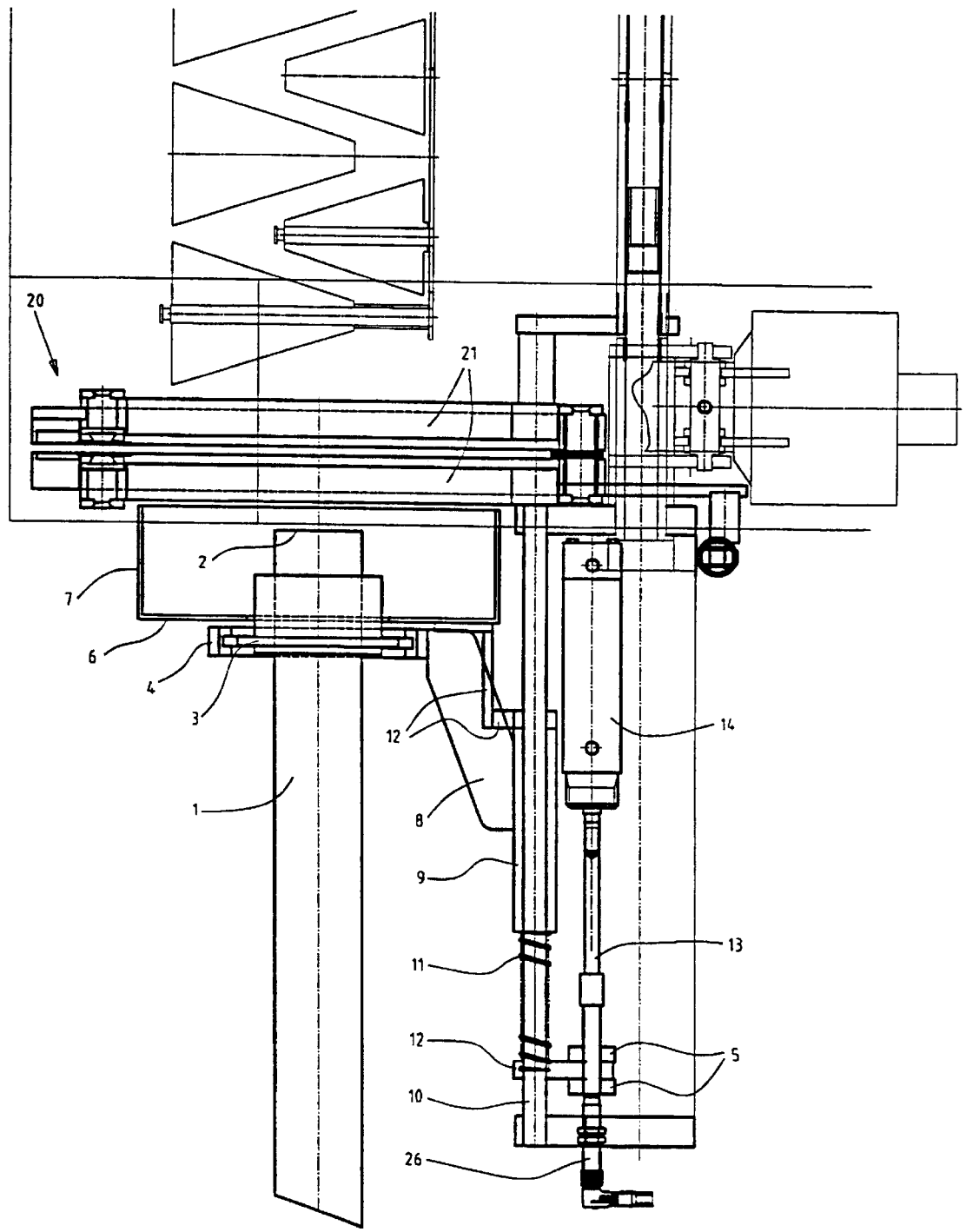
FIG. 1 shows a top view of the orifice end of the filling tube of the inventive filling device with a closing means and a part of the transport means for the filled packages.

On the filling tube 1 of an otherwise not represented filling mechanism of a conventional filling device, a brake ring 3 is located close to the orifice end 2 of the filling tube 1, which brake ring is held in a housing 4. Between the brake ring 3 and the filling tube 1 the packaging material, which is kept on the latter in the form of a supply folded in an accordion-like manner, is withdrawn towards the orifice 2 of the filling tube 1 and during the filling operation is passed through the succeeding components of the filling device. Together with the bottom 6 and the safety ring 7, the housing 4 with the brake ring 3 forms a "safety bell", which is disposed coaxial and concentric with respect to the axis of the filling tube 1.

Together with the housing 4 of the brake ring 3, which by means of a bridge arm 8 is connected with a carriage 9, the safety ring 7 along with the bottom 6 is connected with the piston rod 13 of a pneumatic cylinder 14 via a further carriage 12, which together with the carriage 9 is slidably guided on a longitudinal guideway 10 parallel to the filling tube 1, so that upon actuation of said pneumatic cylinder the brake ring housing 4 together with the brake ring 3 and the safety ring 7 together with the bottom 6 are moved in longitudinal direction of the filling tube 1. The brake ring housing 4 together with the brake ring 3 can separately be moved against the spring 11 for replacing the brake ring 3; in addition, the design of the sleeve 5 as setting ring provides for the adjustability of the axial position of the brake ring housing 4 in the operating position.

Figure 3:
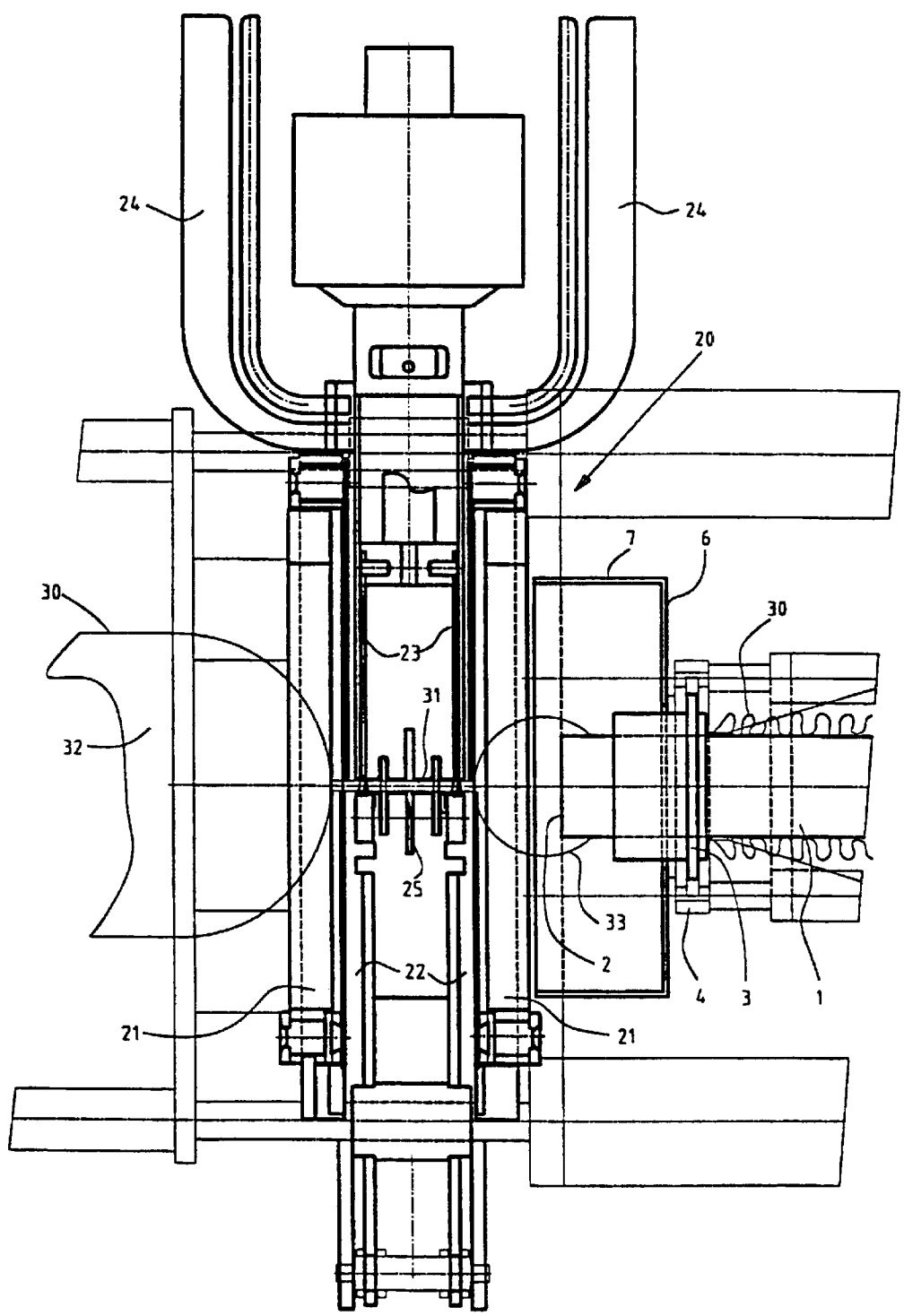
FIG. 3 shows a side view of segments of the representation shown in FIG. 1.

In downstream direction before the orifice 2 of the filling tube 1 there is provided a closing means designated with 20 as a whole, which on the one hand comprises the two crimping elements 21 of a spreader and on the other hand two closure clip setting means including the matrixes 22, the punches 23 and the magazines 24, which closure clip setting means can be moved between the spread crimping elements at the neck 31 of packaging material 30 formed by the same; furthermore, a separating means 25 is also provided between the same (FIG. 3).

In the representation of FIG. 1, the filling device is in its operating condition during a filling operation (but without representation of packaging material and filling). In this operating position, the safety ring 7 is outside the space circumscribed by the closing means 20—also in the spread condition of the crimping elements 21. FIG. 3 illustrates this spread condition between the end of a completely filled package 32 represented in a cut-away view and the beginning of a package 33 to be filled later on. FIG. 1 and FIG. 3 clearly illustrate that in this neutral position of the safety ring 7, which corresponds to the functional position of the brake ring 3, said safety ring prevents interference with the crimping element 21 adjacent the orifice 2 of the filling tube 1 (at the bottom in FIG. 1, to the right in FIG. 3).

Figure 2:
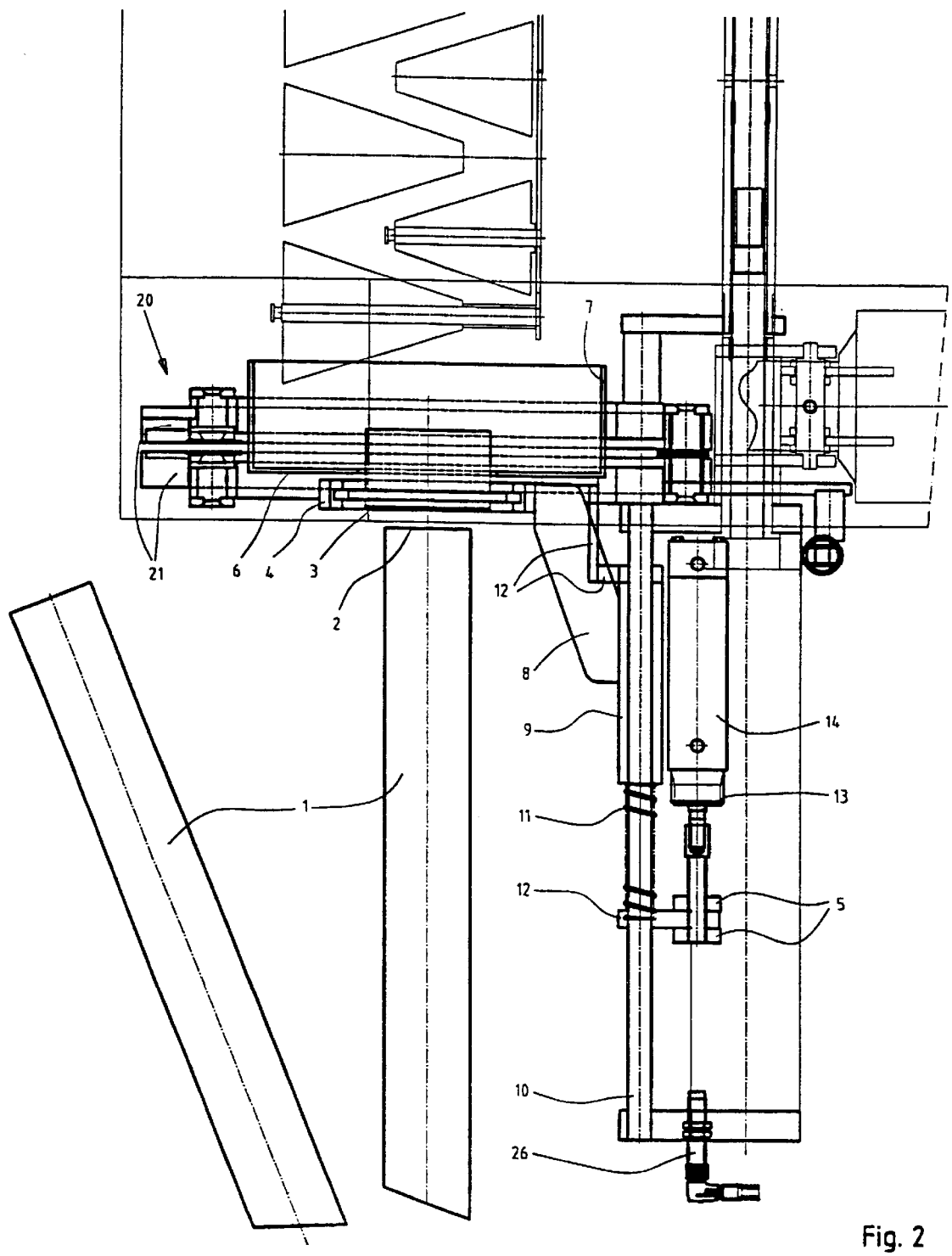
FIG. 2 shows a top view corresponding to FIG. 1, but with the brake ring withdrawn from the filling tube and with the filling tube cleared for being charged with packaging material.

When the supply of packaging material 30 stored on the filling tube 1 is used up and should be replaced by a new supply, the carriages 9 and 12 are moved into the position represented in FIG. 2 by retracting the piston rod 13 into the cylinder 14. Via the arm 8, the brake ring 3 together with its housing 4 is withdrawn from the filling tube 1. The entrained safety ring 7 then is disposed between the radially inwardly movable elements of the closing means 20, and so—as can be seen in FIG. 2—even if the upper crimping element 21 with respect to FIG. 2 (to the left in FIG. 3) is in the spread position represented in FIG. 3. In the case of an unintended closing pulse for any of the radially inwardly movable elements (crimping elements 21, matrixes 22, punches 23, separating means 25), the same would impinge on the safety ring 7 and prevent that for instance a finger of an operator disposed inside the closing means 20 is hurt.

In this operating condition represented in FIG. 2, the filling tube 1 can be swivelled to the side for being charged with new packaging material, as is likewise indicated in FIG. 2. Alternatively, in the case of two or more filling heads there can also be considered a revolver-like introduction of another filling tube 1 into the operating position.

As soon as a filling tube 1 charged with packaging material 30 is available for the further filling operation and has taken its operating position, the brake ring 3 is moved over the filling tube 1 by ejecting the piston rod 13 from the cylinder 14, and the safety ring 7 is retracted from the space enclosed by the closing means 20. At the same time, the piston rod 13 actuates a limit switch 26, which initiates an operating cycle of the closing means 20.

What is claimed is:

1. A device for filling flowable to pasty filling into tubular packaging material having an open end and a closed end which due to pressure of the filling entering the packaging material is withdrawn from a filling tube against the frictional force of a casing brake ring which encloses the filling tube and is held in a casing brake housing, comprising radially inwardly movable closing elements which radially crimp the packaging material being disposed after the filling tube in flow direction of the filling, wherein the casing brake housing and a safety ring which is arranged coaxially and concentrically to the filling tube are connected to separate movable carriages and are movable jointly by the carriages in axial direction of the filling tube to position the safety ring between the radially inward movable closing elements to prevent inadvertent crimping movement of the closing elements when the casing brake ring and housing moves away from the filling tube.

2. The device as claimed in claim 1, wherein at an end facing the filling tube the safety ring is closed by a circular bottom.

3. The device as claimed in claim 2 wherein, for replacing the brake ring, the brake ring housing Is separately movable against the force of a spring.

4. The device as claimed in claim 1 wherein, for replacing the brake ring, the carriage to which the brake ring housing is connected is separately movable against the force of a spring.

5. The device as claimed in claim 1, wherein the carriage to which the safety ring is connected is movably guided on a longitudinal guideway a arranged in parallel to the filling tube and is movable into end position by a fluid-actuated cylinder.

6. The device as claimed in claim 1, further comprising a safety switch which switches off the closing elements when the safety ring leaves a first position, and which initiates a single closing operation when the safety ring returns to said first position.

* * * * *

UNITED STATES PATENT AND TRADEMARK OFFICE
CERTIFICATE OF CORRECTION

PATENT NO. : 6,651,705 B1
DATED : November 25, 2003
INVENTOR(S) : Topfer

It is certified that error appears in the above-identified patent and that said Letters Patent is hereby corrected as shown below:

Column 4,
Line 28, "inward movable" should read -- inward movable --
Line 30, "ring and housing moves" should read -- ring and housing move --
Line 36, "housing Is separately" should read -- housing is separately --
Line 44, "guideway a arranged" should read -- guideway arranged --

Signed and Sealed this

Fourteenth Day of June, 2005

JON W. DUDAS
*Director of the United States Patent and Trademark Office*